US009634502B2

(12) United States Patent
Von Novak, III et al.

(10) Patent No.: US 9,634,502 B2
(45) Date of Patent: Apr. 25, 2017

(54) FAST BATTERY CHARGING THROUGH DIGITAL FEEDBACK

(71) Applicant: QUALCOMM Incorporated, San Diego, CA (US)

(72) Inventors: William Henry Von Novak, III, San Diego, CA (US); Linda Stacey Irish, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 14/463,909

(22) Filed: Aug. 20, 2014

(65) Prior Publication Data

US 2016/0056651 A1    Feb. 25, 2016

(51) Int. Cl.
*H02J 7/00*    (2006.01)
(52) U.S. Cl.
CPC .......... *H02J 7/0044* (2013.01); *H02J 7/0004* (2013.01); *H02J 7/0052* (2013.01); *H02J 2007/0001* (2013.01); *H02J 2007/0062* (2013.01); *H02J 2007/0096* (2013.01)
(58) Field of Classification Search
USPC ................................. 320/104, 107, 109, 114
See application file for complete search history.

(56) References Cited

U.S. PATENT DOCUMENTS

| | | | |
|---|---|---|---|
| 5,808,443 A | 9/1998 | Lundstrom | |
| 5,825,155 A * | 10/1998 | Ito ................... | G01R 19/16542 |
| | | | 320/118 |
| 7,495,414 B2 | 2/2009 | Hui | |
| 7,834,591 B2 | 11/2010 | Hussain et al. | |
| 7,952,322 B2 | 5/2011 | Partovi et al. | |
| 9,325,187 B2 * | 4/2016 | Lee ........................ | H02J 7/0052 |
| 2011/0292278 A1 * | 12/2011 | Kurihara ............... | H02J 7/0031 |
| | | | 348/372 |
| 2012/0153908 A1 | 6/2012 | Wu | |

(Continued)

FOREIGN PATENT DOCUMENTS

WO    WO-2009/050625 A2    4/2009

OTHER PUBLICATIONS

International Search Report and Written Opinion—PCT/US2015/045038—ISA/EPO—Oct. 22, 2015. (13 total pages).

*Primary Examiner* — Brian Ngo
(74) *Attorney, Agent, or Firm* — Arent Fox LLP (57) ABSTRACT

Methods and apparatus for charging a battery of a portable device are disclosed, including receiving, by a charging component, an amount of voltage on a power bus connectable to an external device, wherein the charging component charges the battery with the amount of voltage received. The methods and apparatus include authenticating, by an authentication component, the portable device with the external device via a plurality of signal lines, wherein the authentication component is configured to transmit one or more authentication signals on one or more of the plurality of signal lines. The methods and apparatus include transmitting, by a configuration component, a modified voltage signal and a modified current signal to the external device via the plurality of signal lines, wherein the modified voltage signal and the modified current signal are operable to cause the external device to modify the amount of voltage transmitted to the power bus.

28 Claims, 8 Drawing Sheets

(56) References Cited

U.S. PATENT DOCUMENTS

| | | | |
|---|---|---|---|
| 2013/0009597 A1* | 1/2013 | Boot | B60L 3/12 320/109 |
| 2013/0200841 A1* | 8/2013 | Farkas | H02J 7/0042 320/107 |
| 2013/0257364 A1* | 10/2013 | Redding | H02J 5/005 320/108 |
| 2014/0070774 A1 | 3/2014 | Terlizzi et al. | |
| 2014/0117923 A1* | 5/2014 | Hawawini | G06F 1/26 320/107 |
| 2014/0253021 A1* | 9/2014 | Luke | H02J 7/0013 320/107 |
| 2014/0347008 A1* | 11/2014 | Chae | H02J 5/005 320/108 |
| 2015/0229153 A1* | 8/2015 | Kung | H02J 7/0052 320/162 |

\* cited by examiner

FAST BATTERY CHARGING THROUGH DIGITAL FEEDBACK

FIELD

Aspects of the present disclosure relate generally to power management of portable devices, and more particularly, to an apparatus and method for charging a battery through digital feedback, thereby providing enhanced charging capabilities in a battery charging system.

BACKGROUND

Power requirements for modern portable electronics are increasing very rapidly; e.g., devices having larger displays, Long Term Evolution (LTE) communication devices (radios, modems, etc.), multi-core processors, and so on. To maintain acceptable operating durations, such devices increasingly utilize batteries with higher capacity. In such systems, battery charging times tend to be very long when conventional power sources are used. The reasons include: (1) limited power capability (e.g., for a universal serial bus (USB), a 5V/1.8 A maximum); and (2) voltage headroom issues between input power source and battery. Furthermore, many readily available power sources (e.g., monitors, notebooks, etc.) cannot be utilized because of their high-voltage operation versus what the portable device can tolerate. Also, implementing a solution that requires the use of a secondary portable device connector (e.g., proprietary connector, wall adapter, etc.) significantly increases solution and consumer cost.

With battery capacities increasing, 5V input voltage does not provide enough voltage headroom to achieve sufficiently high charge currents due to cable, connector, printed circuit board (PCB), and charger impedances. Many batteries now have a float voltage of about 4.35V, which makes this issue worse, especially since the trend is toward the use of higher voltages. For example, a 2S (e.g., 2 cell) stack provides about 8.4V or 8.7V, thus requiring a voltage higher than 5V to charge efficiently.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method for charging a battery of a portable device is disclosed. The method includes receiving, by a charging component, an amount of voltage on a power bus connectable to an external device, wherein the charging component charges the battery with the amount of voltage received. Further, the method includes authenticating, by an authentication component, the portable device with the external device via a plurality of signal lines, wherein the authentication component is configured to transmit one or more authentication signals on one or more of the plurality of signal lines. Moreover, the method includes transmitting, by a configuration component, a modified voltage signal and a modified current signal to the external device via the plurality of signal lines, wherein the modified voltage signal and the modified current signal are operable to cause the external device to modify the amount of voltage transmitted to the power bus.

In another aspect, an apparatus for charging a battery of a portable device is disclosed. The apparatus includes a means for receiving an amount of voltage on a power bus connectable to an external device, wherein the charging component charges the battery with the amount of voltage received. Further, the apparatus includes means for authenticating the portable device with the external device via a plurality of signal lines, wherein the authentication component is configured to transmit one or more authentication signals on one or more of the plurality of signal lines. Moreover, the apparatus includes means for transmitting a modified voltage signal and a modified current signal to the external device via the plurality of signal lines, wherein the modified voltage signal and the modified current signal are operable to cause the external device to modify the amount of voltage transmitted to the power bus.

In another aspect, an apparatus for charging a battery of a portable device is disclosed. The apparatus includes a charging component configured to receive an amount of voltage on a power bus connectable to an external device, wherein the charging component charges the battery with the amount of voltage received. Further, the apparatus includes an authentication component configured to authenticate the apparatus with the external device via a plurality of signal lines, wherein the authentication component is configured to transmit one or more authentication signals on one or more of the plurality of signal lines. Moreover, the apparatus includes a configuration component configured to transmit a modified voltage signal and a modified current signal to the external device via the plurality of signal lines, wherein the modified voltage signal and the modified current signal are operable to cause the external device to modify the amount of voltage transmitted to the power bus.

In yet another aspect, a non-transitory computer-readable media executable by an apparatus for code for charging a battery of a portable device is disclosed. The computer-readable media includes receiving, by a charging component, an amount of voltage on a power bus connectable to an external device, wherein the charging component charges the battery with the amount of voltage received. The computer-readable media includes code for authenticating, by an authentication component, the portable device with the external device via a plurality of signal lines, wherein the authentication component is configured to transmit one or more authentication signals on one or more of the plurality of signal lines. The computer-readable media includes code for transmitting, by a configuration component, a modified voltage signal and a modified current signal to the external device via the plurality of signal lines, wherein the modified voltage signal and the modified current signal are operable to cause the external device to modify the amount of voltage transmitted to the power bus.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional components, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

Several aspects of a battery charging system will be presented with reference to various apparatus, computer-readable medium, and methods. These apparatus, computer-readable medium, and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software or any combination thereof depends upon the particular application and design constraints imposed on the overall system.

By way of example, an element, or any portion of an element, or any combination of elements may be implemented with a "processing system" or "control block" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise registers, a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

The present aspects generally relate to power management of portable (e.g., mobile) devices. Specifically, it may be desirable to charge portable devices quickly, so that the portable device spends less time plugged into a charger or remaining tethered to a power source. However, many factors may limit the amount of power to be delivered to the battery of the portable device including battery charge acceptance, temperature rise limits, and connector limitations. In some instances, lithium-ion batteries may accept a charge rate at a 2C (e.g., battery charger may be specified in terms of the battery capacity or C rate) rate, and in some cases at a 3C rate. As a result, in some cases for some portable devices, the bulk charge time may be around 20-30 minutes. However, when a lithium-ion battery switches to a constant voltage (e.g., finishing) charge state, it may take an additional 20-30 minutes to get the last 10-30% of the charge into the battery. As such, there is no alternative in that forcing more charge during the constant charge state may cause the charger to go over a safe limit (e.g., 4.2-4.5 volts (V) for a current lithium-ion battery) of voltage for the battery cells. At most, an extremely accurate voltage may be maintained during the constant charge state (for example, if a cell is limited to a maximum voltage of 4.2V+/−0.05V, then a charger may maintain 4.24V+/−0.01V).

As such, the main issue with rapidly charging batteries is temperature rise limits. Since most battery chargers in mobile devices operate with 5V, a switcher is used to reduce 5V to the 3.6V-4.2V that the battery requires. Due to the switchers requiring inductors and rapid switching, and also because there is great pressure to make switcher within battery charging systems s as small as possible, the switchers are often sources of significant heat. For example, an 8 Watt charger that is 93% efficient may dissipate over half a Watt of power. Since most portable devices may dissipate a Watt without exceeding battery temperature limits, less than half a Watt of power is left for components of the portable device, e.g., power amplifier, backlight, audio amplifier, etc., to dissipate. Also, in some cases, the charger may shutdown if a user charges while using the portable device. Even more so, a design that keeps the battery under the shutdown limits may degrade the battery because high voltages and high rate charging at high temperatures rapidly degrade lithium-ion batteries. In some instances, a micro-USB connector may pass about 1.8 amps safely, which limits power at 5V to about 9 Watts.

Accordingly, in some aspects, the present methods, computer-readable media, and apparatuses may provide an efficient solution, as compared to current solutions, by increasing voltage, so that current may remain the same while power increases. Thus, the present apparatus, computer-readable media, and methods may generally improve flexibility in voltages delivered to the portable device, which may result in a higher overall rate of charge.

Figure 1:
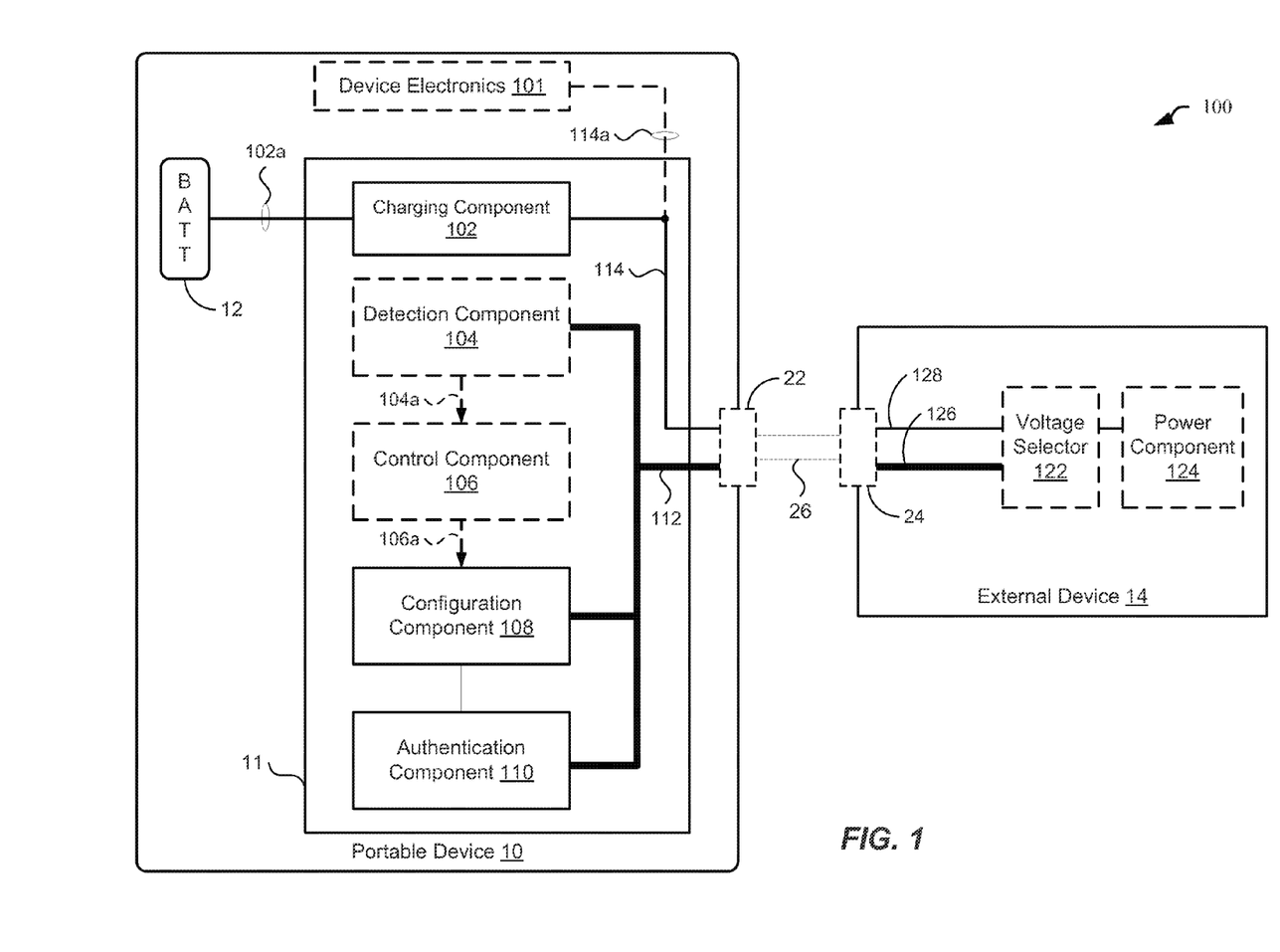
FIG. 1 is a schematic diagram illustrating an example of an aspect of a battery charging system of the present disclosure.

Referring to FIG. 1, in an aspect, a battery charging system 100 is configured to facilitate charging a battery of a portable device through digital feedback. Battery charging system 100 includes at least one portable device 10, such as but not limited to a mobile communication device such as a smartphone, a digital camera, a computer tablet, a gaming device, or any other device that obtains power from a battery and that may be carried by a user. The portable device 10 may include a battery 12 to power the portable device. In some aspects, the battery 12 may be a rechargeable battery that a circuit 11 may charge. The battery 12 may be a single cell configuration, or may be a multi-cell stack configuration.

The portable device 10 may be connectable to an external device 14 that is connectable to or that is a power supply. For example, in some aspects, the external device 14 may be an alternating current (AC) adapter such as a wall adapter configured to be plugged in to an AC supply. In other aspects, for instance, the external device 14 may be an electronic device that can supply power to the portable device. For example, in an aspect, the external device 14 may be laptop computer that supplies power from its own battery pack or from a connection to an AC supply. Further, for example, in an aspect, the external device 14 may be a power supply, a battery charger, or any other device capable of delivering power for charging battery 12 to portable device 10.

Optionally, the portable device 10 and external device 14 may have respective connectors 22 and 24 that provide an electrical interface to the respective device. Further, in an optional aspect, an electrical link 26, such as but not limited to a wire or cable, may electrically connect the portable device 10 and the external device 14, which connection may, in some aspects, be via the respective connectors 22 and 24. In some aspects, electrical link 26 and/or connectors 22 and 24 may additionally provide a mechanical connection between portable device 10 and external device 14.

In some aspects, the circuit 11 may include a charging component 102 configured to receive an amount of voltage for charging battery 12, an authentication component 110 configured to authenticate the portable device 10 with the external device 14 to enable charging, and a configuration component 108 configured to provide digital feedback to modify the amount of voltage transmitted to the portable device 10 by the external device 14, which may enable reducing an amount of time that it takes to charge battery 12 as compared to previously used techniques. The charging component 102 determines whether the external device 14 is an HVDCP device based on the amount of voltage received by charging component 102 on the VBUS.

For instance, in an optional aspect, charging component 102 may receive the amount of voltage for charging battery 12 from a power bus 114 that provides an electrical connection to a power bus 128 from the external device 14. In a further optional aspect, the power bus 128 from the external device 14 may be connected to, or may be located in, the electrical link 26. In some aspects, the charging component 102 may be directly connected to the external device 14, e.g., via power bus 114. As used in this case, the "directly connected" refers an electrical connection between the charging component 102 and the external device 14 that does not include a switcher component being located in between the charging component 102 and the external device 14.

Additionally, in an optional aspect, authentication component 110 and configuration component 108 may respectively exchange signals with external device 14 via a signal bus 112 that electrically connects, directly or indirectly, circuit 11 to a signal bus 126 from external device 14. In an aspect, for example, signal bus 112 may include a plurality of signal bus lines for electrical connection to signal lines in signal bus 126 from external device 14 and/or the electrical link 26. The number of signal bus lines included in the signal bus 112 may vary from one aspect to another.

An example aspect according to principles of the present disclosure may include a Universal Serial Bus (USB) interface that operates according to USB Specification, Revision 2.0. More particularly, the system depicted in FIG. 1 may include circuit 11 based on the USB Battery Charging Specification, Revision 1.2 (BC1.2). A large majority of portable devices conform to BC1.2, and so this aspect may have desirable benefits in terms of manufacturing and installed user base. Accordingly, in some aspects, circuit 11 may operate in conformance with BC1.2, thus providing a charging device that is compatible with existing portable devices and external charging devices, and portable devices that are easy to manufacture and that offer one or more benefits of the present disclosure. As such, in some aspects, portable device 10 may be any electronic device that incorporates a USB interface. Likewise, the external device 14 may be any electronic device that incorporates a USB interface and can provide power to the portable device 10.

Similarly, in a USB implementation, electrical link 26 may comprise four wires including a power line called a voltage bus (VBUS), signal bus lines referred to as D+ and D−, and a ground line. These four wires may also be found, for example, in standard USB A and USB B plugs (e.g., connectors 22 and 24). Accordingly, VBUS constitutes an example of power bus 114 and 128. The D+ and D− lines may represent an example of signal lines comprising signal bus 112 and 126.

In an optional aspect, circuit 11 may additionally include detection component 104, which may be configured to determine the amount of voltage received by the charging component 102 from external device 14. As such, detection component 104 may communicate with configuration component 108 in order to regulate the amount of power used to charge battery 12. For example, the detection component 104 may be connected to the signal bus 112 to detect various electrical configurations on the signal bus lines comprising the signal bus 112. For instance, the external device 14 may assert an electrical configuration on the signal lines of the electrical link 26 that the detection component 104 may detect on the signal bus 112. In an aspect, detection component 104 may output a representation of a detected electrical configuration in a signal 104a for use by other components of circuit 11, as will be discussed below. In some instances, the detection component 104 may comprise voltage comparators, current sensors, and the like to detect an electrical configuration on the signal bus 112. Further, for example in a USB implementation, detection component 104 may include a comparator to compare a voltage asserted on VBUS with a voltage level VOTG_SESSN_VLD. The comparison may be used to determine that an attachment to external device 14 has been made, e.g., when the voltage level on VBUS exceeds VOTG_SESSN_VLD. Additionally, in some aspects, detection component 104 may determine, either continuously or periodically, the amount of voltage received.

As used herein, an electrical configuration asserted on the signal bus lines of the signal bus 112 may be a voltage level (e.g., an amount of voltage), including ground potential, asserted on one or more signal bus lines, or multiple voltage levels asserted on several signal bus lines. An electrical configuration may also be one or more currents flowing respectively in one or more of the signal bus lines. In some instances, an electrical configuration may be asserted by connecting one or more of the signal bus lines to a resistor (or other passive device such as a capacitor or inductor), or connecting together one or more of the signal bus lines. In some instances, an electrical configuration may be asserted using a combination of voltage, current flows, and/or resistor (or other passive device).

Further, as mentioned above, configuration component 108 may modify the amount of voltage transmitted to the portable device 10 by the external device 14, such as by transmitting a modified voltage signal and a modified current signal to the external device 14. For example, as mentioned above, an electrical configuration may be asserted on the signal bus lines of the signal bus 112 by an external device 14, e.g., electrically connected to the signal bus via electrical link 26. Similarly, an electrical configuration (e.g., modified voltage signal and modified current signal) may be asserted on the signal bus lines by the configuration component 108. In some instances, the configuration component 108 may include voltage sources, current sources, switches (e.g., MOS switches), passive devices (e.g., a resistor), and the like to assert some combination of voltage levels and/or current levels on one or more of the signal bus lines that comprise the signal bus 112. In some aspects, configuration component 108 may generate one or more electrical configurations as a function of one or more control signals 106a that may be received from a control component 106, as is discussed below. In some instances, the modified voltage signal corresponds to an amount of voltage the portable device 10 requests that differs from the default amount of voltage (e.g., 5 V) that external device 14 normally transmits, and the modified current signal corresponds to a threshold amount of current that the external device is limited to transmitting to the portable device 10 In some instances, the threshold amount of voltage may be equivalent to the modified voltage signal corresponding to the amount of voltage requested by portable device 10. In other instances, the threshold amount of voltage may be equivalent to the threshold amount of voltage that portable device 10 is capable of receiving without malfunctioning.

Additionally, in another optional aspect, circuit 11 may include control component 106 configured to control the amount of voltage received from external device 14 based on whether or not external device 14 is authenticated, and/or based on the amount of voltage received. For example, control component 106 may operate in aspects of circuit 11 that do not include the optional detection component 104 as well as in aspects of circuit 11 that do include the optional detection component 104. More specifically, in an aspect, control component 106 may be configured to modify the modified voltage signal and the modified current signal transmitted by the configuration component 108. For example, the control component 106 may be connected to receive one or more signals 104a from the detection component 104. The signals 104a may be indicative of a detected electrical configuration asserted on the signal bus 112 by the external device 14. The control component 106 may be connected to provide one or more control signals 106a to the configuration component 108 in order to assert a particular electrical configuration on the signal bus 112.

As mentioned above, authentication component 110 may be configured to authenticate the portable device 10 with the external device 14. As used herein, the term "to authenticate" or "authenticating" refers to the portable device 10 proving an identity to external device 14. As a result of the portable device 10 successfully authenticating, the external device 14 may send a modified voltage on the electrical link 26. For example, authentication component 110 may attempt to authenticate the portable device 10 with the external device 14 via signaling exchanged over the signal bus 112. Authenticating the portable device 10 allows external device 14 to provide modifiable amounts of voltage to portable device 10. In certain instances, a default amount of voltage (e.g., 5 V) is transmitted to the portable device 10 Further, configuration component 108 may transmit a modified voltage signal and a modified current signal to the external device 14, which in turn, may transmit a modified amount of voltage (e.g., 8.4 V). In some instances, control component 106 may modify the modified voltage signal and the modified current signal transmitted by configuration component 108 based at least in part on the amount of voltage received by detection component 104 and whether authentication component 110 was able to authenticate portable device 10. In instances where the authentication component 110 fails to authenticate portable device 10, external device 14 may be configured to transmit a standard amount of voltage, such as 5 V in a USB implementation. In other instances, the authentication component 110 may authenticate the portable device 10 with the external device 14 either initially upon connecting with the external device 14 or periodically during the connection.

Moreover, in an optional aspect, the portable device 10 may include device electronics (load) 101 that may require electrical power to operate. For example, if the portable device 10 is a computer tablet, the device electronics 101 may comprise the components such as a processor, memory, display, etc. The device electronics 101 may be connected to the power bus 114 via connector 114a to draw power received by the circuit 11, such as from battery 12 or from external device 14.

In an aspect, the external device 14 may optionally include a voltage selector 122 and a power component 124, in addition to other electronic circuitry (not shown), to control and generate the amount of voltage provided to portable device 10. For example, the external device 14 may be laptop computer, or a power supply (e.g., an AC adapter), etc. The power component 124, which may include but is not limited to a circuit, may provide a voltage at one of several selectable voltage levels that can be delivered to the portable device 10 via electrical link 26. For example, the external device 14 may include a power bus 128 that is connected to the power line in the electrical link 26. The voltage selector 122 may selectively control the amount of voltage generated by power component 124, and connect the voltage produced by the power component 124 to the power bus 128. In some aspects, the voltage selector 122 may be connected to a signal bus 126 comprising a plurality of signal bus lines, which may be electrically connected to signal bus 112 via electrical link 26. As will be explained in more detail below, in an aspect, the voltage selector 122 may detect or sense an electrical configuration on the signal bus 126 and control or otherwise signal the power component 124 to output a voltage level that corresponds to the detected electrical configuration. The voltage selector 122 may comprise digital logic, analog circuitry, or a combination of digital and analog components to detect or sense the electrical configuration on the signal bus 126.

Figure 2:
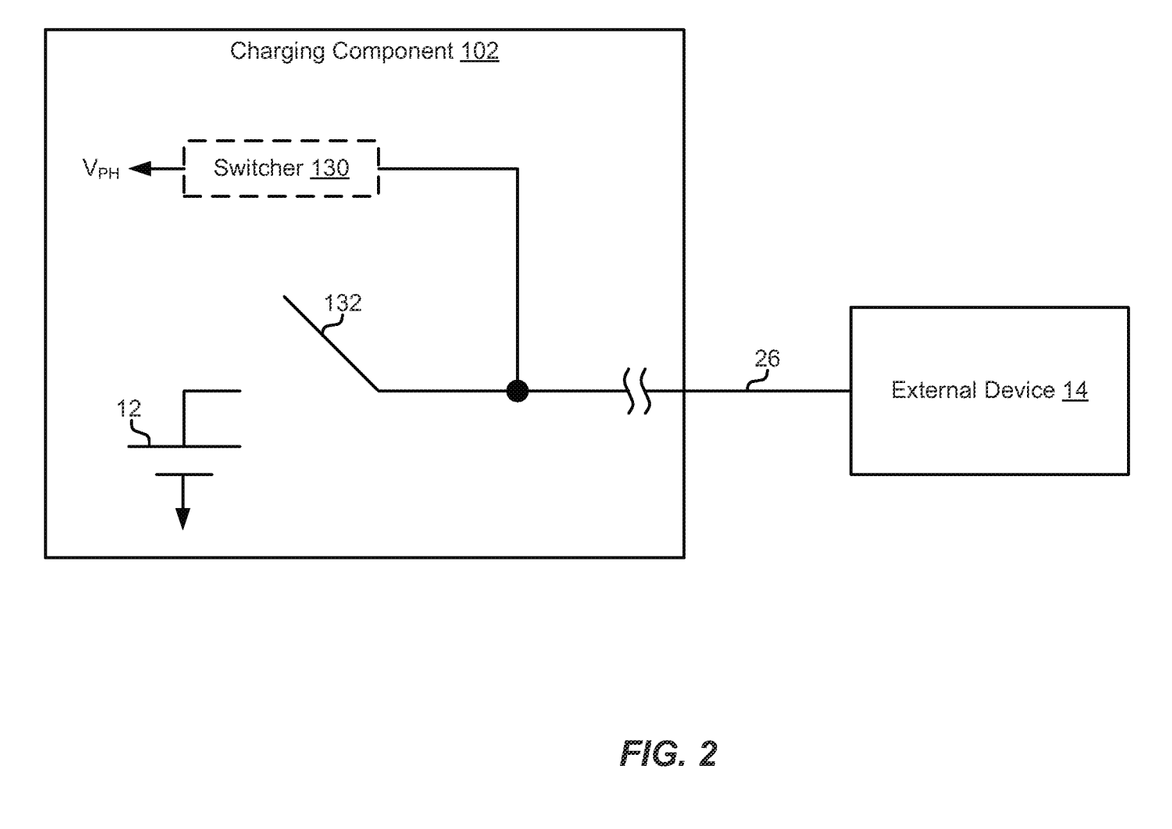
FIG. 2 is a schematic diagram illustrating an example of an aspect of the charging component in the battery charging system.

FIG. 2 is a schematic diagram further illustrating the functionality and operation of an aspect of the charging component 102 (FIG. 1) of the circuit 11 in conjunction with an external device 14. In an aspect, charging component 102 may be connected directly, e.g., without a switcher being in line, with external device 14 via electrical link 26. The external device 14 may provide a voltage at one of several selectable voltage levels that can be delivered to the charging component 102 via electrical link 26. In some instances, for example, external device 14 may provide 3.6-4.2 V to charging component 102. Feedback from a voltage sensor (e.g., detection component 104 of FIG. 1) may be configured to prevent the voltage from exceeding a safe charging threshold. Further, switch 132 may be provided to connect and disconnect battery 12 to and from external device 14.

In an aspect, for example, when switch 132 is in the closed position (e.g., connected), the amount of voltage provided at battery 12 may be 3.6-4.2 V. In this structure, the temperature issues caused by a switcher not being in direct connection with the external device 14 are eliminated. However, the connector current limit issue still exists and with 3.6-4.2 V being provided, the maximum charge rate would only be 9 Watts. As such, in an optional aspect, switcher 130 may be included in charging component 102 in order to drop the voltage provided on electrical link 26 by external device 14 to the voltage required by the portable device 10 (e.g., $V_{PH}$).

Figure 3:
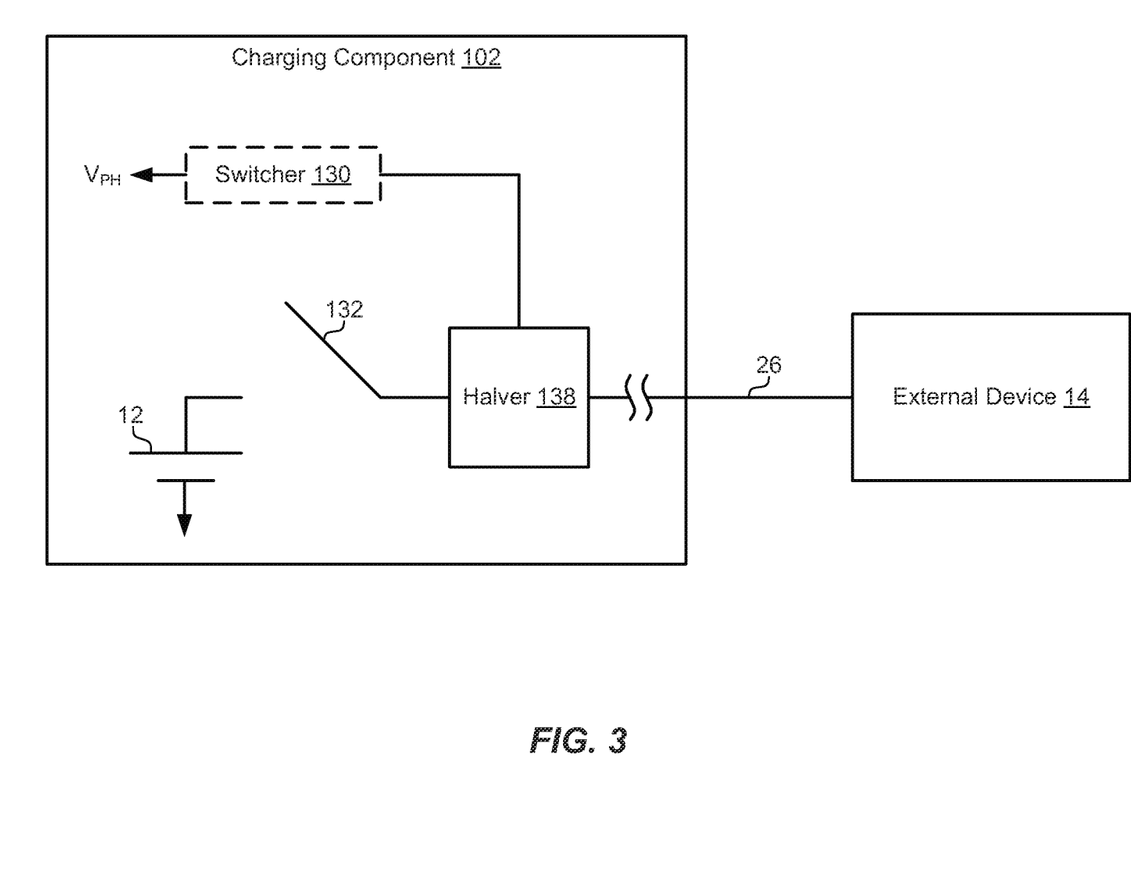
FIG. 3 is a schematic diagram illustrating another example of an aspect of the charging component in the battery charging system.

FIG. 3 is another schematic diagram illustrating the functionality and operation of an aspect of the charging component 102 (FIG. 1) of the circuit 11 in conjunction with an external device 14. In an aspect, charging component 102 may be connected with external device 14 through a halver 30 and via electrical link 26. In an aspect, halver 30 may be a voltage halver configured to decrease voltage by half so that the external device 14 may increase the voltage to double the normal amount transmitted to a connector connected to the halver 30. Increasing the amount of voltage transmitted to the charging component 102 may cause the maximum charge rate to increase as well. The external device 14 may provide a voltage at one of several selectable voltage levels that can be delivered to the charging component 102 via electrical link 26. Further, switch 132 may be provided to connect and disconnect battery 12 to and from external device 14.

In some instances, external device 14 may provide 7.2-8.4 V to charging component 102. When switch 132 is in the closed position (e.g., connected), the amount of voltage provided at battery 12 may be 3.6-4.2 V after the halver 138 halves the 7.2-8.4 V provided by external device 14. Again, the temperature issues caused by a switcher not being in direct connection with the external device 14 are eliminated. Furthermore, with 7.2-8.4 V being provided on electrical link 26, the maximum charge rate may be 18 Watts. In an optional aspect, switcher 130 may be included in charging component 102 in order to drop the voltage provided on electrical link 26 by external device 14 to the voltage required by the portable device 10 (e.g., $V_{PH}$).

Moreover, in a multiple stack cell configuration (e.g., 2S cells, where "2S" stands for "two stacked" cells), external device 14 may provide 14.4-16.8 V on electrical link 26 to charging component 102. As such, halver 138 may receive 14.4-16.8 V from electrical link 26 and halve the voltage to output 7.2-8.4 V to battery 12. With 14.4-16.8 V being provided on electrical link 26, the maximum charge rate may be 30 Watts.

Figure 4:
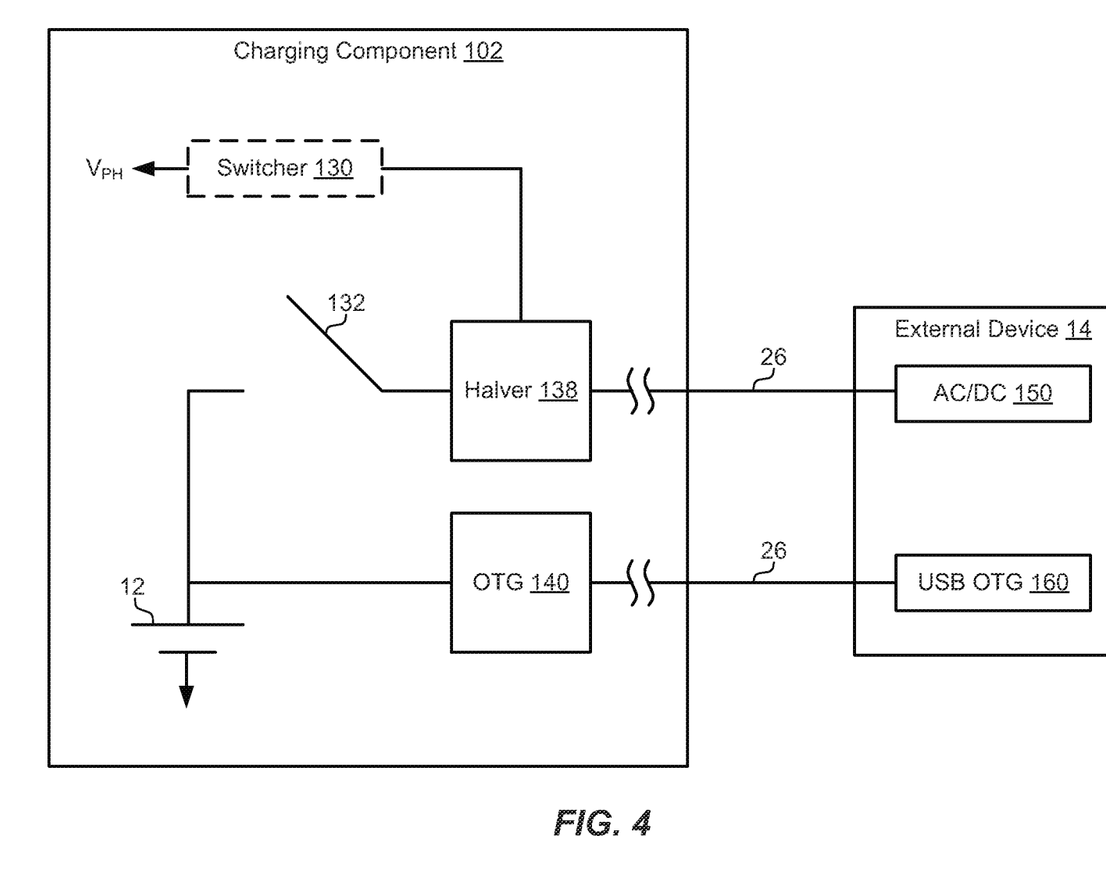
FIG. 4 is a schematic diagram illustrating an example of an aspect of a transport option in the battery charging system.

FIG. 4 is a schematic diagram illustrating an example of an aspect of a transport option between the charging component 102 (FIG. 1) of the circuit 11 and the external device 14 in the battery charging system 100. In an aspect, charging component 102 may be connected with an alternating current or direct current (AC/DC) power supply 150 of external device 14 through a halver 30 and via electrical link 26. Further, charging component 102 may be connected with USB (On-The-Go) (OTG) 160 of external device 14 through OTG 140 via electrical link 26. Moreover, switch 132 may be provided to connect and disconnect battery 12 to and from external device 14. OTG 140 may be connected with battery 12 as well. In an optional aspect, switcher 130 may be included in charging component 102 in order to drop the voltage provided on electrical link 26 by external device 14 to the voltage required by the portable device 10 (e.g., $V_{PH}$).

In an aspect, USB OTG 160 and OTG 140 provide for isochronous transfers, e.g., a transfer that is made within a specified timeframe, in order for the amount of voltage provided on electrical link 26 to be sensed. As such, portable device 10 (FIG. 1) may simultaneously receive an amount of voltage on a power bus 114 (via electrical link 26) and transmit one or more signals on the signal bus 112 (via electrical link 26). In some instances, the one or more signals may correspond to authentication of the portable device 10 (FIG. 1), modified voltage signal, and modified current signal.

Figure 5:
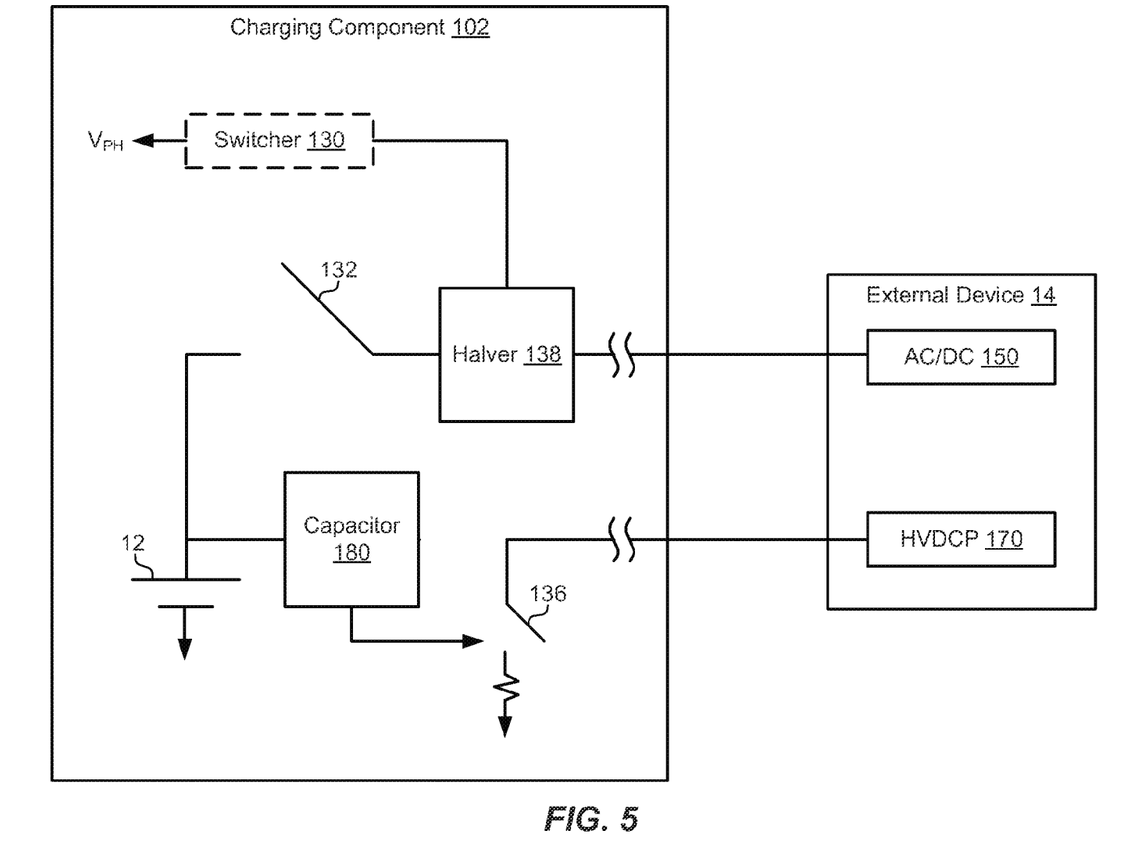
FIG. 5 is a schematic diagram illustrating an example of an aspect of a transport option in the battery charging system.

FIG. 5 is another schematic diagram illustrating an example of an aspect of a transport option between the charging component 102 (FIG. 1) of the circuit 11 and the external device 14 in the battery charging system 100. In an aspect, charging component 102 may be connected with an AC/DC power supply 150 of external device 14 through a halver 30 and via electrical link 26. Further, charging component 102 may be connected with a High Voltage Dedicated Charging Port (HVDCP) 170 of external device 14 through capacitor 180 in parallel with switch 132 via electrical link 26. A conventional DCP is typically specified to output 5V. By comparison, an external device 14 according to the present disclosure may output any one of several higher voltage levels (e.g., 9V, 12V, 20V, etc.), in addition to a 5V level. Accordingly, an external device 14 may be referred to as a high voltage DCP (HVDCP). In accordance with principles of the present disclosure, the portable device 10 (FIG. 1) may perform an additional detection to distinguish between an external device that is a conventional DCP and an HVDCP.

Moreover, switch 132 may be provided to connect and disconnect battery 12 to and from external device 14. Capacitor 180 may be connected with battery 12 as well. Switch 132 may be provided to connect charging component 102 and capacitor 180 with Rdm_dwn resistor. In an optional aspect, switcher 130 may be included in charging component 102 in order to drop the voltage provided on electrical link 26 by external device 14 to the voltage required by the portable device 10 (e.g., $V_{PH}$).

In an aspect, HVDCP 170 may use a series of switched resistors to provide unique voltages via electrical link 26 to charging component 102, which may enable higher voltage operation. In some instances, these voltages may be sent as unique voltages on the D+ and D− data lines. In these instances, portable device 10 (FIG. 1) may control the Rdm_dwn switch to transmit varying amounts of voltage to the charging component 102. These changes in voltage may be sensed and a serial protocol may be used to send data back to external device 14.

An advantageous aspect of the present disclosure is that backward compatibility with existing devices is maintained. For example, a portable device in accordance with the principles of the present disclosure will recognize and operate with an HVDCP, according to the processing outlined in FIG. 5 above. Moreover, a portable device in accordance with the principles of the present disclosure will recognize and operate with non-HVDCP devices, such as an SDP, CDP, DCP, and in some aspects, non-BC1.2 ports (e.g., APPLE power adapters). From the HVDCP side, an HVDCP will operate with a portable device of the present disclosure in accordance with the processing outlined in FIG. 5. Moreover, an HVDCP will operate with a conventional portable device.

Figure 6:
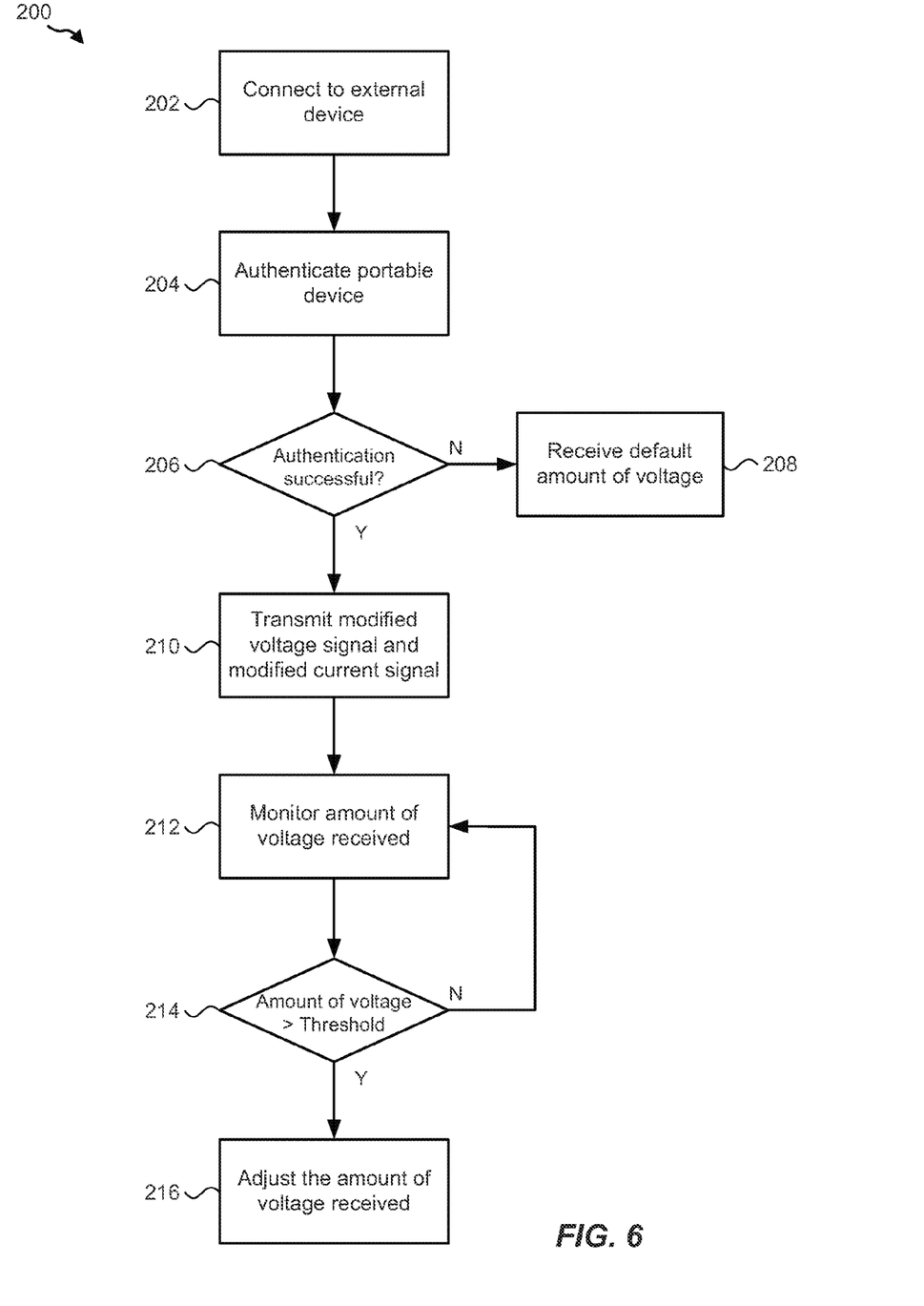
FIG. 6 is a flow diagram illustrating an example of an aspect of a method for providing digital feedback in the battery charging system.

Referring to FIG. 6, in operation, a portable device such as portable device 10 (FIG. 1) may perform a method 200 of an aspect for charging a battery 12 through digital feedback. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

In an aspect, at block 202, method 200 includes connecting a portable device to an external device. For example, as described herein, portable device 10 (FIG. 1) may connect with external device 14 via connectors 22 and 24 and electrical link 26. In some instances, external device 14 may be configured to provide power to portable device 10 to recharge battery 12.

Further, in an aspect, at block 204, method 200 includes authenticating the portable device with the external device. For example, as described herein, portable device 10 (FIG. 1) may execute authentication component 110 to authenticate the portable device 10 with the external device 14. In some instances, authenticating the portable device 10 comprises transmitting identification information of the portable device 10 to the external device 14, so that the external device 14 transmits a modified amount of voltage to the portable device 10.

In another aspect, at block 206, method 200 includes determining whether the authentication was successful. For example, as described herein, portable device 10 (FIG. 1) may execute authentication component 110 to determine whether the authentication was successful. In instances where authentication was not successful, method 200 may proceed to block 208.

At block 208, method 200 includes receiving a default amount of voltage from the external device. For example, as described herein, portable device 10 (FIG. 1) may receive a default amount of voltage (e.g., 5 V in a USB implementation) from the external device 14 since authentication was not successful.

However, if it is determined that authentication was successful, then method 200 may proceed to block 210. At block 210, method 200 includes transmitting modified voltage signal and a modified current signal. For example, as described herein, portable device 10 (FIG. 1) may execute configuration component 108 to transmit a modified voltage signal and a modified current signal. In some instances, the modified voltage signal and the modified current signal cause external device 14 to modify the amount of voltage transmitted to portable device 10, e.g., received on the power bus 114.

Further, at block 212, method 200 includes monitoring an amount of voltage received. For example, as described herein, portable device 10 (FIG. 1) may execute detection component 104 to monitor an amount of voltage received from external device 14 via power bus 114. In some instances, detection component 104 may monitor, either continuously or periodically, the amount of voltage being received.

At block 214, method 200 includes determining whether the amount of voltage received exceeds a threshold amount of voltage. For example, as described herein, portable device 10 (FIG. 1) may execute control component 106 to determine whether the amount of voltage received exceeds a threshold amount of voltage. In some instances, the threshold amount of voltage may be equivalent to the modified voltage signal corresponding to the amount of voltage requested by portable device 10. In other instances, the threshold amount of voltage may be equivalent to the threshold amount of voltage that portable device 10 is capable of receiving without malfunctioning. If it is determined that the amount of voltage received does not exceed a threshold amount of voltage, then method 200 may return to block 212.

However, if it is determined that the amount of voltage received exceeds a threshold amount of voltage, then method 200 may proceed to 216. At block 216, method 200 includes adjusting the amount of voltage received. For example, as described herein, portable device 10 (FIG. 1) may execute control component 106 to modify the modified voltage signal and the modified current signal to attempt to adjust the amount of voltage received to be within the threshold, and signal configuration component 108 to transmit the modified voltage signal and the modified current signal to external device 14.

Figure 7:
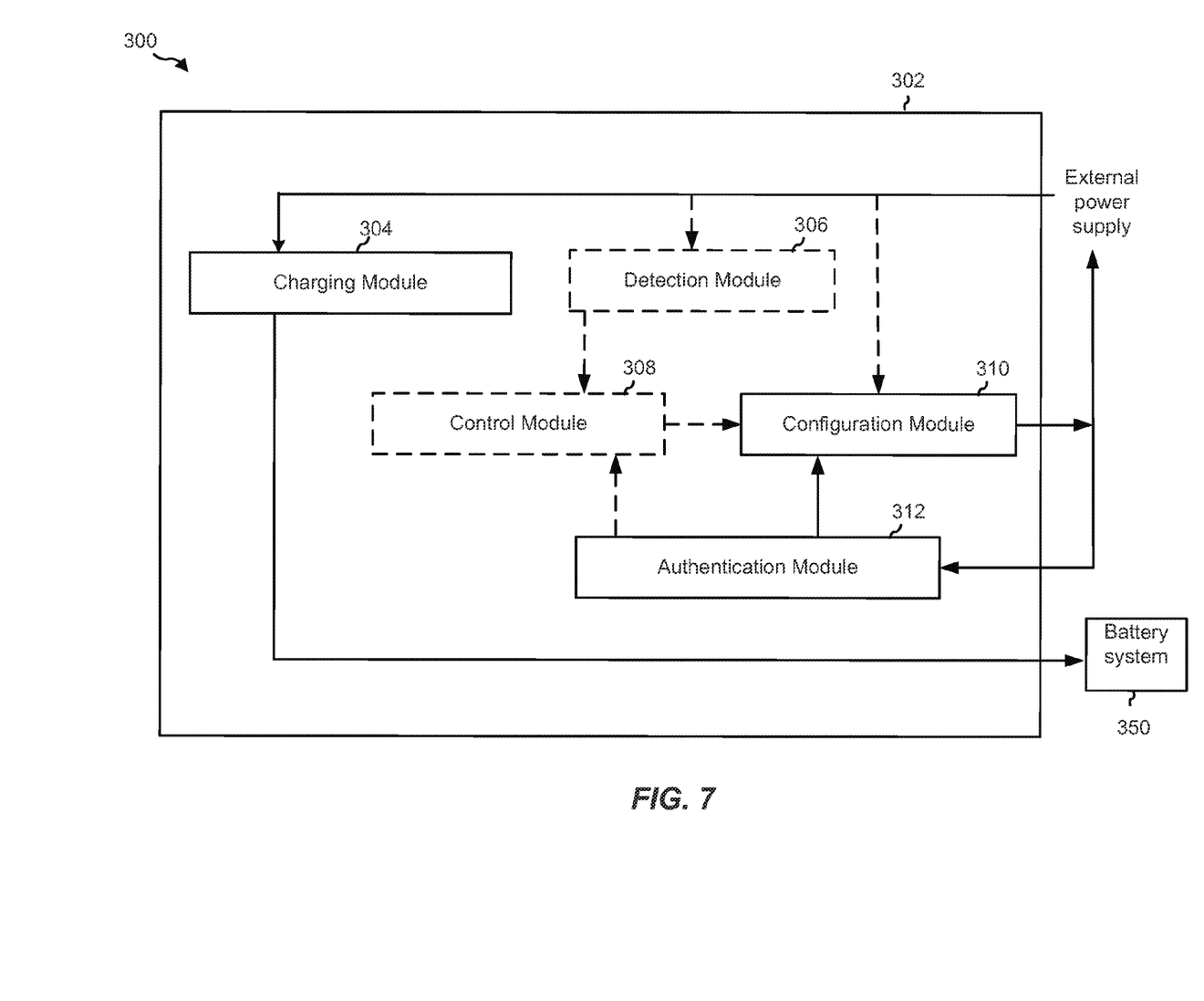
FIG. 7 is a conceptual data flow diagram illustrating the data flow between different modules/means/components in an example of an apparatus in the battery charging system.

FIG. 7 is a conceptual data flow diagram 300 illustrating the data flow between different modules/means/components in an example of an aspect of an apparatus 302. The apparatus includes a charging module 304 that receives voltage from an external power supply and provides voltage to a battery system 350. An optional detection module 306 may determine the amount of voltage supplied by external power supply. An optional control module 308 may modify the modified voltage signal and the modified current signal based on the amount of voltage detected by detection module 306. Further, configuration module 310 transmits a voltage signal and a current signal, which may be the modified voltage signal and the modified current signal, to the external power supply so that the external power supply adjusts the amount of voltage it provides. Moreover, authentication module 312 authenticates apparatus 302 with the external power supply so that customized voltage may be provided instead of the default amount of voltage. Examples of the modules may be found in FIG. 1 and the associated description.

The apparatus may include additional modules that perform each of the steps of the algorithm in the aforementioned flow charts of FIG. 6. As such, each step in the aforementioned flow charts of FIG. 6 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 8:
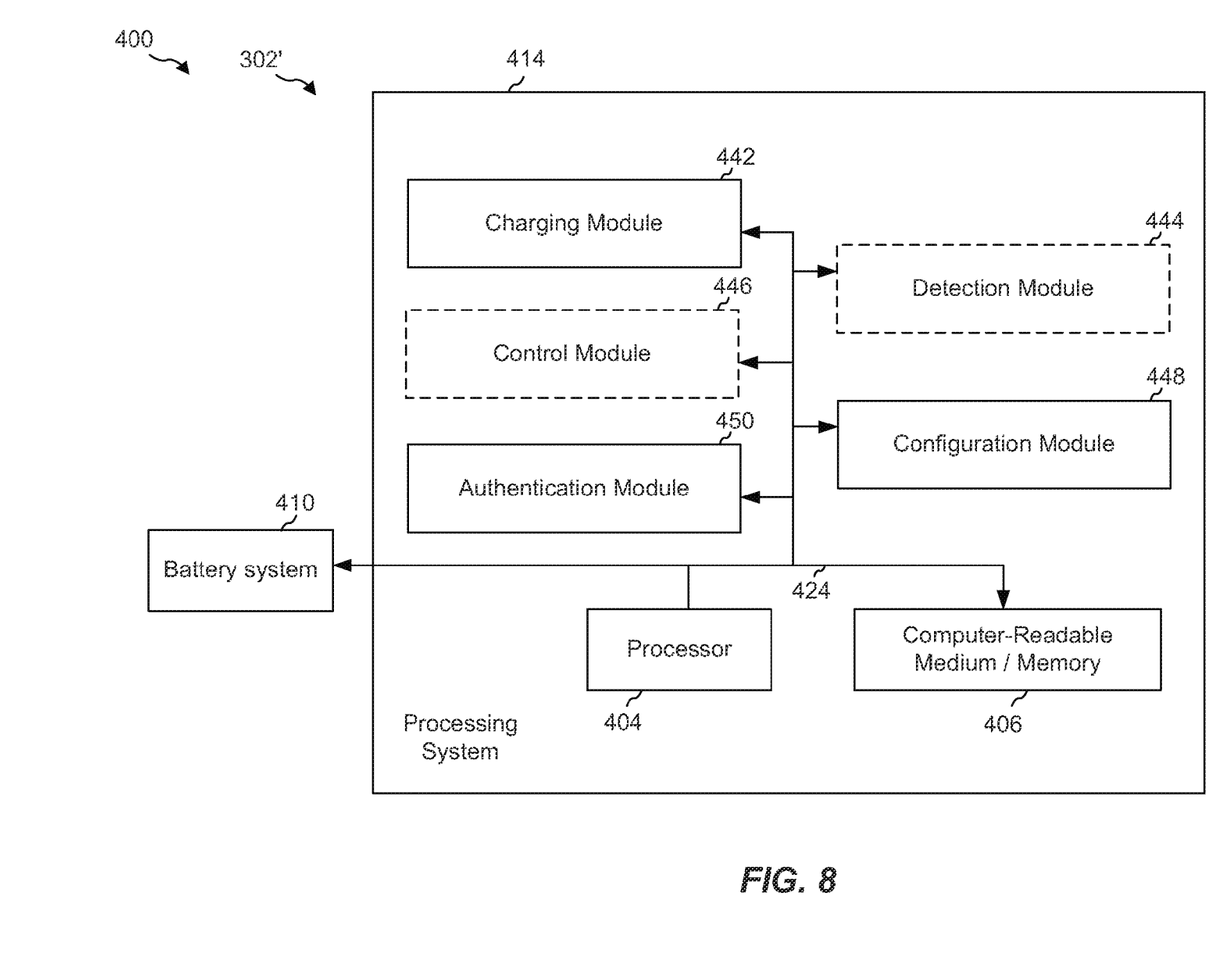
FIG. 8 is a diagram illustrating an example of an aspect of a hardware implementation for an apparatus employing a processing system.

FIG. 8 is a diagram 400 illustrating an example of a hardware implementation for an apparatus 302' employing a processing system 414. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware modules, represented by the processor 404, the modules 440, 442, 446, 448, and 450 and the computer-readable medium/memory 406. The bus 424 may also link various other circuits such as timing sources, peripherals, voltage regulators, and power management circuits, which are well known in the art, and therefore, will not be described any further.

The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the modules 440, 442, 446, 448, and 450. The modules may be software modules running in the processor 904, resident/stored in the computer readable medium/memory 406, one or more hardware modules coupled to the processor 404, or some combination thereof.

In one configuration, the apparatus 302/302' for a battery charger system includes a means for providing energy, by a first charger, to a battery system; a means for providing energy, by a second charger, to the battery system based on an operation state of the first charger; and a means for stopping the providing energy, by the second charger, to the battery system based on an operation state of the second charger.

The aforementioned means may be one or more of the aforementioned modules of the apparatus 302 and/or the processing system 414 of the apparatus 302' configured to perform the functions recited by the aforementioned means.

It is understood that the specific order or hierarchy of steps in the processes disclosed is an illustration of examples of one or more approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

We claim:

1. An apparatus for charging a battery, comprising:
   a charging component configured to receive an amount of voltage on a power bus connectable to an external device, wherein the charging component charges the battery powering the apparatus with the amount of voltage received;
   an authentication component configured to authenticate the apparatus with the external device via a plurality of signal lines, wherein the authentication component is configured to transmit one or more authentication signals on one or more of the plurality of signal lines from the apparatus to the external device, wherein the power bus receives a default amount of voltage transmitted by the external device when the authentication component fails to authenticate the apparatus with the external device; and
   a configuration component configured to transmit a modified voltage signal and a modified current signal to the external device via the plurality of signal lines when the authentication component authenticates the apparatus with the external device, wherein the modified voltage signal and the modified current signal are operable to cause the external device to modify the amount of voltage transmitted to the power bus.

2. The apparatus of claim 1, wherein the charging component is directly connected to the power bus.

3. The apparatus of claim 1, wherein the charging component is further configured to include a halver directly connected to the power bus, wherein the halver is configured to divide the amount of voltage in half.

4. The apparatus of claim 1, wherein the modified voltage signal corresponds to an amount of voltage the apparatus requests, and wherein the modified current signal corresponds to a threshold amount of current that the external device is limited to transmitting to the apparatus.

5. The apparatus of claim 1, further comprising a detection component configured to determine the amount of voltage received from the external device.

6. The apparatus of claim 5, further comprising:
a control component configured to modify the modified voltage signal and the modified current signal transmitted by the configuration component based at least in part on the amount of voltage received and whether the apparatus is authenticated;
wherein the control component is configured to be prevented from operating when the apparatus fails to authenticate.

7. The apparatus of claim 5, wherein the detection component determines, either continuously or periodically, the amount of voltage received by the charging component.

8. The apparatus of claim 1, wherein the apparatus operates in conformance to the Universal Serial Bus (USB) Specification, wherein the power bus comprises a voltage bus (VBUS) and the plurality of signal lines comprise a D− signal line and a D+ signal line.

9. The apparatus of claim 8, wherein the apparatus further operates in a USB On-The-Go (OTG) configuration, and wherein the apparatus simultaneously receives an amount of voltage on the power bus and transmits one or more signals on the plurality of signal lines.

10. The apparatus of claim 1, wherein the external device is a High Voltage Dedicated Charging Port (HVDCP) device, wherein the power bus comprises a voltage bus (VBUS) and the plurality of signal lines comprise a D− signal line and a D+ signal line.

11. The apparatus of claim 10, wherein the charging component determines whether the external device is an HVDCP device based on the amount of voltage received by charging component on the VBUS.

12. The apparatus of claim 1, wherein the battery is configured as at least one or both of a single cell battery or a multiple cell battery.

13. The apparatus of claim 1, wherein the authentication component is configured to authenticate the apparatus with the external device either initially upon connecting with the external device or periodically.

14. An apparatus for charging a battery, comprising:
means for receiving an amount of voltage on a power bus connectable to an external device, wherein the means for receiving charges the battery powering the apparatus with the amount of voltage received;
means for authenticating the apparatus with the external device via a plurality of signal lines, wherein the means for authenticating is configured to transmit one or more authentication signals on one or more of the plurality of signal lines from the apparatus to the external device;
means for receiving a default amount of voltage transmitted by the external device when the means for authenticating fails to authenticate the portable device with the external device; and
means for transmitting a modified voltage signal and a modified current signal to the external device via the plurality of signal lines when the means for authenticating authenticates the portable device with the external device, wherein the modified voltage signal and the modified current signal are operable to cause the external device to modify the amount of voltage transmitted to the power bus.

15. A method for charging a battery of a portable device, comprising:
receiving, by a charging component, an amount of voltage on a power bus connectable to an external device, wherein the charging component charges the battery powering the apparatus with the amount of voltage received;
authenticating, by an authentication component, the portable device with the external device via a plurality of signal lines, wherein the authentication component is configured to transmit one or more authentication signals on one or more of the plurality of signal lines from the apparatus to the external device;
receiving, by the power bus, a default amount of voltage transmitted by the external device when the authentication component fails to authenticate the portable device with the external device; and
transmitting, by a configuration component, a modified voltage signal and a modified current signal to the external device via the plurality of signal lines when the authentication component authenticates the portable device with the external device, wherein the modified voltage signal and the modified current signal are operable to cause the external device to modify the amount of voltage transmitted to the power bus.

16. The method of claim 15, wherein the charging component is directly connected to the power bus.

17. The method of claim 15, wherein the charging component is configured to include a halver directly connected to the power bus, wherein the halver is configured to divide the amount of voltage in half.

18. The method of claim 15, wherein the modified voltage signal corresponds to an amount of voltage the portable device requests, and wherein the modified current signal corresponds to a threshold amount of current that the external device is limited to transmitting to the portable device.

19. The method of claim 15, further comprising determining, by a detection component, the amount of voltage received from the external device.

20. The method of claim 19, further comprising:
modifying, by a control component, the modified voltage signal and the modified current signal transmitted by the configuration component based at least in part on the amount of voltage received and whether the portable device is authenticated;
preventing the control component from operating when the portable device fails to authenticate.

21. The method of claim 19, determining, by the detection component, either continuously or periodically, the amount of voltage received by the charging component.

22. The method of claim 15, wherein the portable device operates in conformance to the Universal Serial Bus (USB) Specification, wherein the power bus comprises a voltage bus (VBUS) and the plurality of signal lines comprise a D− signal line and a D+ signal line.

23. The method of claim 22, wherein the portable device further operates in a USB On-The-Go (OTG) configuration, and wherein the portable device simultaneously receives an amount of voltage on the power bus and transmits one or more signals on the plurality of signal lines.

24. The method of claim 15, wherein the external device is a High Voltage Dedicated Charging Port (HVDCP) device, wherein the power bus comprises a voltage bus (VBUS) and the plurality of signal lines comprise a D− signal line and a D+ signal line.

25. The method of claim 24, further comprising determining, by the charging component, whether the external device is an HVDCP device based on the amount of voltage received by charging component on the VBUS.

26. The method of claim 15, wherein the battery is configured as at least one or both of a single cell battery or a multiple cell battery.

27. The method of claim 15, further comprising authenticating, by the authenticating component, the portable device with the external device either initially upon connecting with the external device or periodically.

28. A computer-readable medium storing computer executable code for charging a battery of a portable device, comprising:
   code for receiving, by a charging component, an amount of voltage on a power bus connectable to an external device, wherein the charging component charges the battery powering the apparatus with the amount of voltage received;
   code for authenticating, by an authentication component, the portable device with the external device via a plurality of signal lines, wherein the authentication component is configured to transmit one or more authentication signals on one or more of the plurality of signal lines from the apparatus to the external device;
   code for receiving a default amount of voltage transmitted by the external device when the means for authenticating fails to authenticate the portable device with the external device; and
   code for transmitting, by a configuration component, a modified voltage signal and a modified current signal to the external device via the plurality of signal lines when the authentication component authenticates the portable device with the external device, wherein the modified voltage signal and the modified current signal are operable to cause the external device to modify the amount of voltage transmitted to the power bus.

* * * * *